United States Patent [19]

Kataoka

[11] Patent Number: 5,539,268
[45] Date of Patent: Jul. 23, 1996

[54] VIBRATION TYPE ACTUATOR DEVICE

[75] Inventor: Kenichi Kataoka, Yokohama, Japan

[73] Assignee: Canon Kabushiki Kaisha, Tokyo, Japan

[21] Appl. No.: 425,771

[22] Filed: Apr. 20, 1995

Related U.S. Application Data

[63] Continuation of Ser. No. 63,778, May 20, 1993, abandoned.

[30] Foreign Application Priority Data

May 21, 1992 [JP] Japan ................................. 4-128841

[51] Int. Cl.$^6$ ..................................................... H02N 2/00
[52] U.S. Cl. .................................................................. 310/316
[58] Field of Search ....................................... 310/316, 317; 318/116

[56] References Cited

U.S. PATENT DOCUMENTS

| | | | |
|---|---|---|---|
| 4,743,788 | 5/1988 | Takagi et al. | 310/316 |
| 4,853,579 | 8/1989 | Kawasaki et al. | 318/116 |
| 4,879,528 | 11/1989 | Gotanda | 310/316 |
| 4,888,514 | 12/1989 | Takahashi et al. | 310/316 |
| 4,914,337 | 4/1990 | Takagi | 310/316 |
| 4,926,084 | 5/1990 | Furutsu et al. | 310/316 |
| 4,998,048 | 3/1991 | Furutsu | 318/116 |
| 5,001,404 | 3/1991 | Kataoka | 318/116 |
| 5,001,442 | 3/1991 | Hanaie et al. | 310/316 |
| 5,004,964 | 4/1991 | Kataoka et al. | 318/128 |
| 5,023,526 | 6/1991 | Kuwabara et al. | 318/116 |
| 5,061,882 | 10/1991 | Takagi | 318/116 |
| 5,159,223 | 10/1992 | Suganuma | 310/316 |
| 5,376,855 | 12/1994 | Suganuma | 310/316 |

FOREIGN PATENT DOCUMENTS

| | | | |
|---|---|---|---|
| 59-156168 | 9/1984 | Japan | H02N 11/00 |
| 63-1379 | 1/1988 | Japan | H02N 2/00 |
| 63-167680 | 7/1988 | Japan | H02N 2/00 |
| 0101974 | 4/1990 | Japan | 310/317 |

*Primary Examiner*—Thomas M. Dougherty
*Attorney, Agent, or Firm*—Fitzpatrick, Cella, Harper & Scinto

[57] ABSTRACT

A vibration type actuator device having a wave speed control range, wherein the driving voltage of a driving signal of the actuator device is controlled in accordance with the difference between a target speed and an actual speed, so that it increases if the actual speed is lower than the target speed, or decreases if the actual speed is higher than the target speed. The frequency of the driving signal also is controlled to decrease if the driving voltage is higher than a predetermined value, or to increase if the driving voltage is lower than the predetermined value.

13 Claims, 6 Drawing Sheets

VIBRATION TYPE ACTUATOR DEVICE

This application is a continuation of application Ser. No. 08/063,778 filed May 20, 1993 now abandoned.

BACKGROUND OF THE INVENTION

1. Field of the Invention

The present invention relates to a driving device for a vibration type actuator, such as an ultrasonic vibration driven motor and, more particularly, to a driving device for a vibration wave actuator which can execute a driving operation with high precision without using a vibration detection sensor.

2. Related Background Art

A vibration type (vibration wave) actuator, such as an ultrasonic vibration driven motor, comprises a vibration member, which is prepared by adhering and fixing piezoelectric elements to one surface side of a metal elastic member, e.g., an elastic member formed in an elliptic shape. The piezoelectric elements are subjected to a polarization treatment, and when AC electric fields having a predetermined phase difference are applied to the piezoelectric elements, a traveling vibration wave is generated on the other surface side of the elastic member.

If the surface, on which the traveling vibration wave is generated, of the elastic member is defined as a driving surface, when a movable member is brought into contact with the driving surface via a compression means, the movable member is driven by a frictional force therebetween. The movable member maybe a rotor for extracting an output, a sheet such as paper, or the like.

Such a vibration wave actuator has characteristics suitable for high-precision alignment. More specifically, since the movable member is always in contact with the elastic member of the vibration member under pressure, when the driving operation of the vibration member is stopped, the movable member is immediately stopped.

On the other hand, the following control methods for driving the vibration wave actuator are available:

(1) a method of controlling the speed on the basis of a voltage in such a manner that a sensor phase is provided in a portion of the piezoelectric elements of the vibration member, and the frequency of a driving voltage is set to be equal to the resonance frequency of the vibration member, as disclosed in Japanese Laid-Open Patent Application No. 63-167680;

(2) a method of directly controlling the speed on the basis of a frequency, as disclosed in Japanese Laid-Open Patent Application No. 59-156168; and (3) a method wherein a sensor phase for detecting a vibration state is provided in the piezoelectric elements of the vibration member, and the frequency of a driving voltage is controlled according to the detected value, as disclosed in Japanese Laid-Open Patent Application No. 63-1379.

Since the frequency-speed characteristics of the vibration wave actuator have characteristics wherein the speed quickly changes on the low-frequency side and slowly changes on the high-frequency side with a resonance point as a boundary, therebetween a frequency region on the high-frequency side of the resonance point is utilized in the control method. Therefore, in order to increase the speed, the frequency is decreased to approach the resonance point, and in order to decrease the speed, the frequency is increased to be separated away from the resonance point.

However, since the control method (1) requires a sensor, the cost is increased. An actuator controlled by this method also is susceptible to noise from the sensor. When low-speed control is executed, control becomes unstable due to a small driving voltage. In addition, since the control method must cover a range from low speed to high speed by changing the voltage amplitude alone, the amplitude setting resolution must be increased, resulting in high cost as a whole.

In the control method (2), since a constant the amplitude of a voltage is set if the frequencies are not adjusted in units of actuators upon starting of these actuators, then the speeds of the actuators upon starting do not coincide with each other, and the actuators perform considerably different operations when they perform movements over a small distance. When the actuator is driven near the resonance frequency, it is susceptible to disturbance. The frequency of the driving voltage is shifted from the resonance point to the low-frequency side by a slight disturbance due to nonlinear vibration characteristics, and as a result, the actuator is abruptly stopped.

Since control method (3) requires a sensor as in control method (1), this results in high cost, and the actuator controlled by this method is susceptible to noise from the sensor.

SUMMARY OF THE INVENTION

One aspect of the application has been made in consideration of the above-mentioned situation, and has as its object to provide a vibration type actuator, which comprises a first control circuit for controlling the value of the first parameter in accordance with a driving state of the actuator, and a second control circuit for controlling a value of a second parameter (e.g., a frequency) of first and second parameters for determining a driving force of the vibration type actuator, so that a value of the first parameter (e.g., a driving pulse width) becomes a predetermined value, and which has a wide control range and resists any disturbance.

One aspect of the application is to provide a vibration type actuator device in which a driving pulse or a pulse phase difference as the first parameter is controlled by the second control circuit in accordance with a driving speed of a driven member driven by the actuator which achieves the above-mentioned object, and the value of the second parameter is controlled by the first control circuit in accordance with the difference between the value of the first parameter and the predetermined value.

Other objects of the present invention will become apparent from the following description of the embodiment taken in conjunction with the accompanying drawings.

DESCRIPTION OF THE EMBODIMENT OF THE INVENTION

Figure 1:
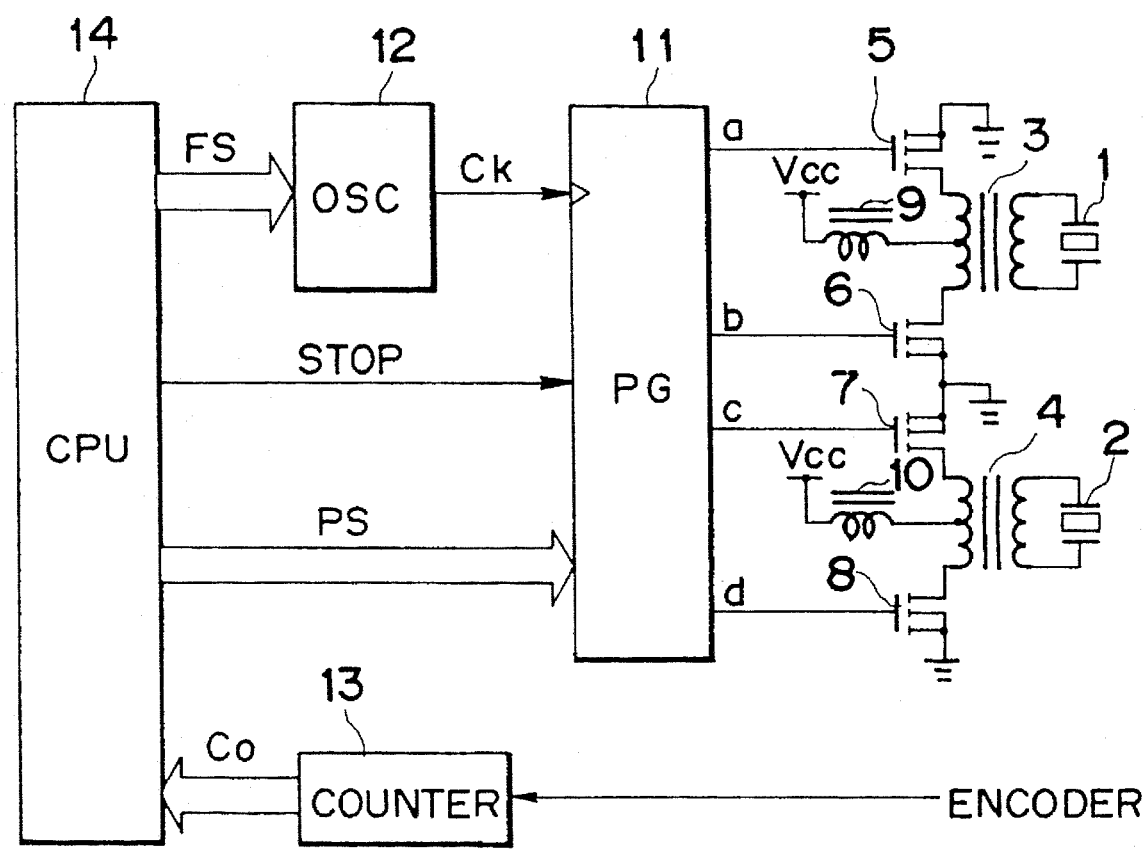
FIG. 1 is a block diagram showing a driving device of a vibration type actuator according to a first embodiment of the present invention.
Figure 2:
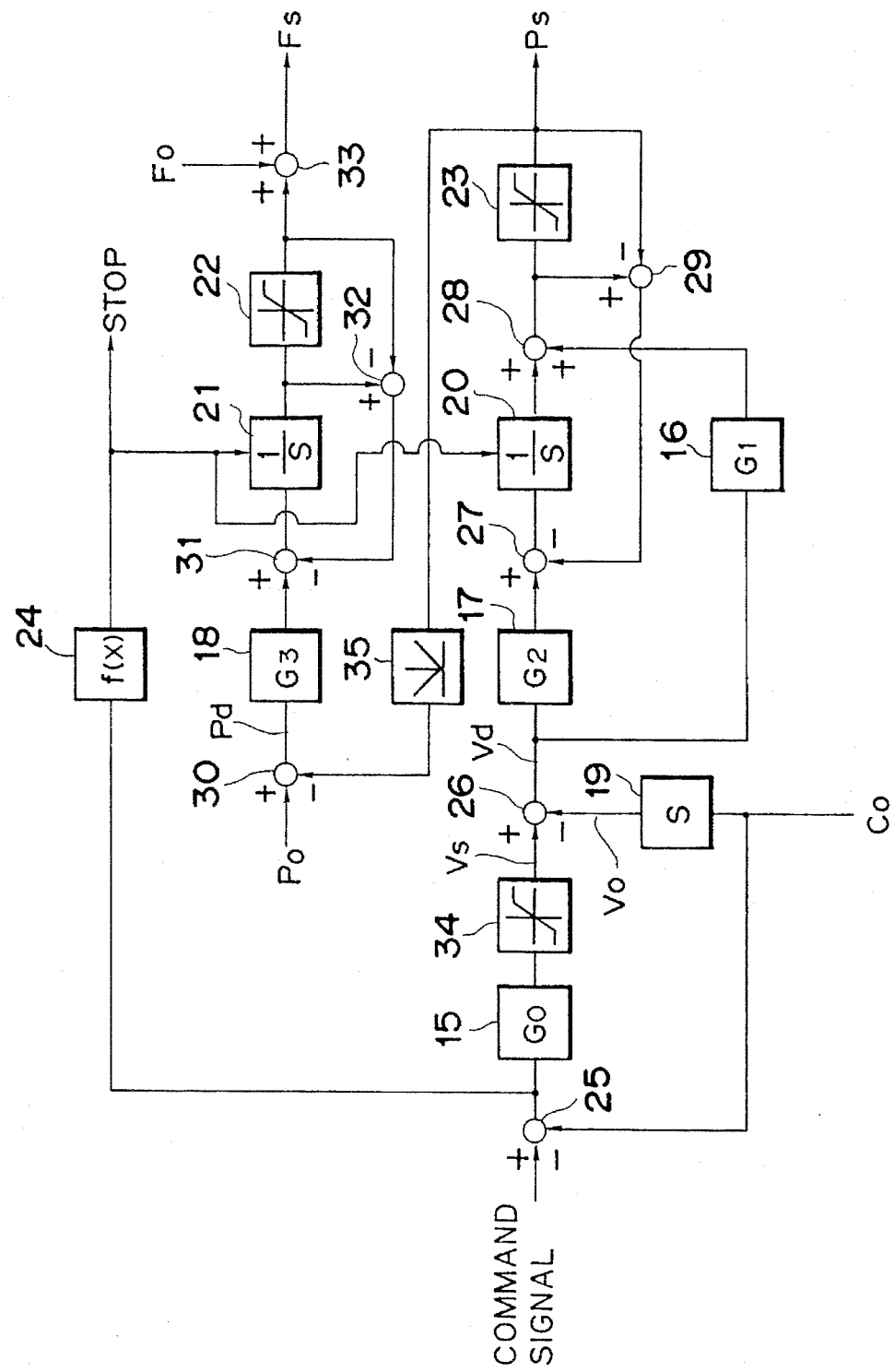
FIG. 2 is a circuit diagram of a CPU shown in FIG. 1.

FIGS. 1 and 2 are block diagrams showing the first embodiment of the present invention. FIG. 1 shows a driving circuit of a vibration wave actuator, and FIG. 2 is a block diagram showing an operation of a CPU (to be described later).

In FIG. 1, the driving circuit includes vibration applying piezoelectric elements (electro-mechanical energy converting elements) 1 and 2 for a vibration wave actuator, boost transformers 3 and 4, MOSFETs 5 to 8, choke coils 9 and 10, a 4-phase pulse generator (to be abbreviated as a PG hereinafter) 11, an oscillator (to be referred to as an OSC hereinafter) 12 capable of digitally setting a frequency, and a counter 13 for counting output pulses from a position detection encoder (not shown), which operates in cooperation with the movement of a movable member (not shown of vibration wave actuator). The count value of the counter 13 represents the moving position (amount) of the movable member. The driving circuit also includes a CPU 14 for controlling the above-mentioned elements. The piezoelectric elements are brought into contact with the movable member (not shown) to vibrate it, thereby driving the movable member. The operation of the PG 11 will be described below, and thereafter, the operation of the CPU 14 will be described.

Figure 4:
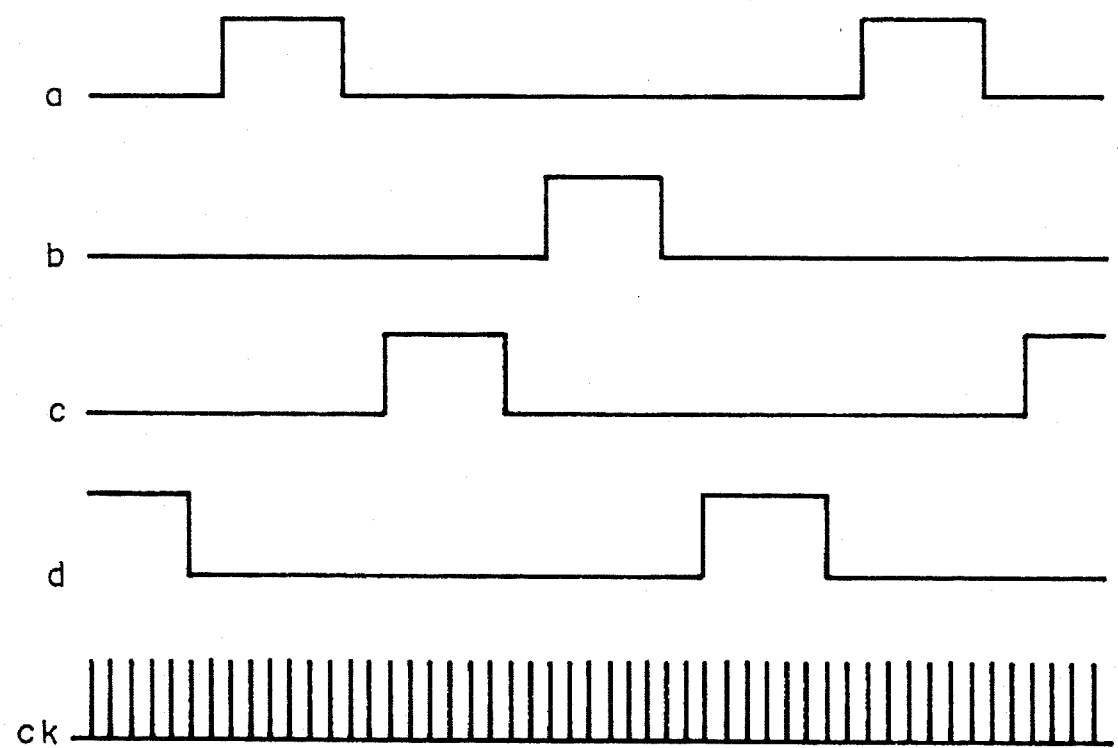
FIG. 4 is a timing chart showing an operation of a pulse generation circuit.
Figure 5:
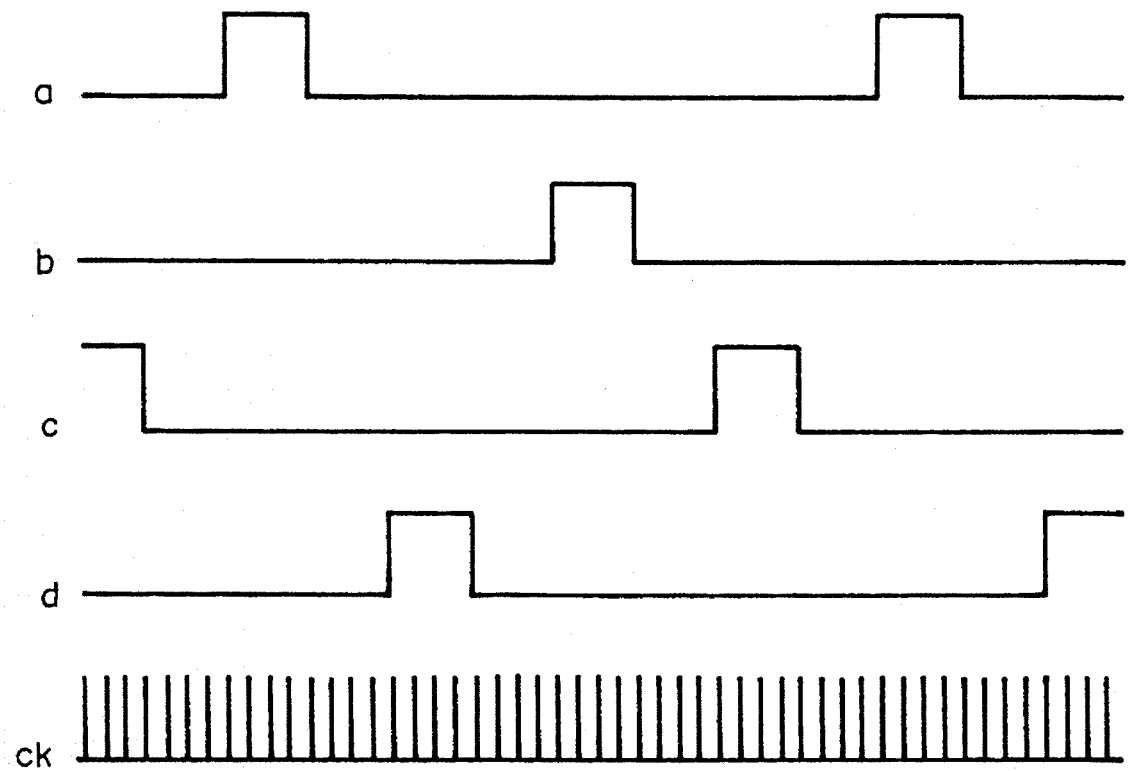
FIG. 5 is a timing chart showing an operation of the pulse generation circuit.
Figure 6:
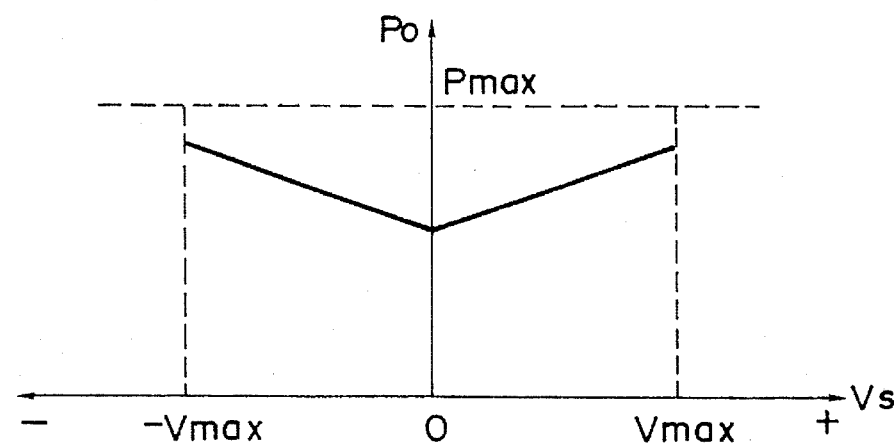
FIG. 6 is a graph showing a value $P_0$ with respect to $V_s$.
Figure 7:
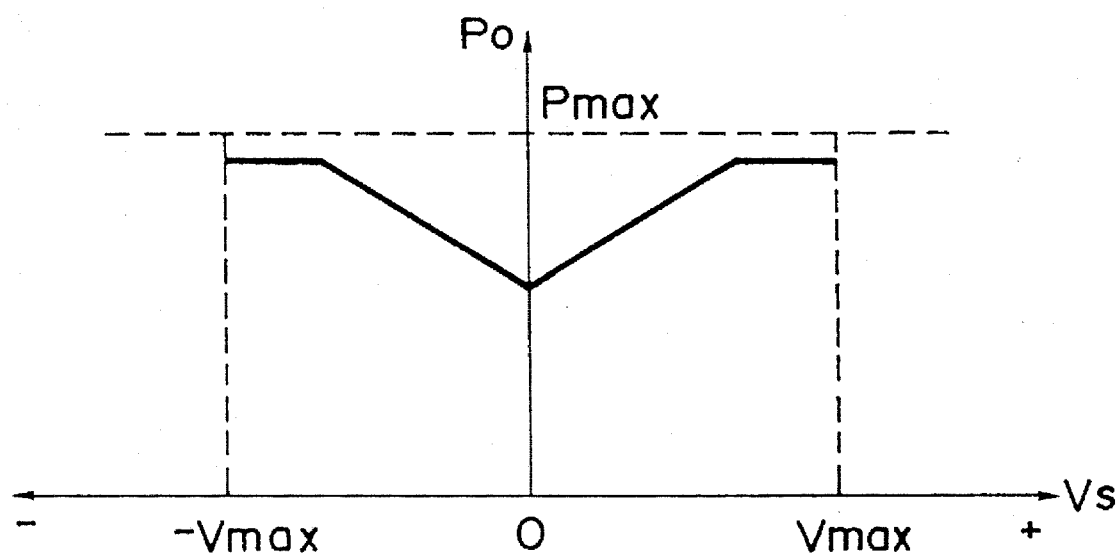
FIG. 7 is a graph showing a value $P_0$ with respect to $V_s$.
Figure 8:
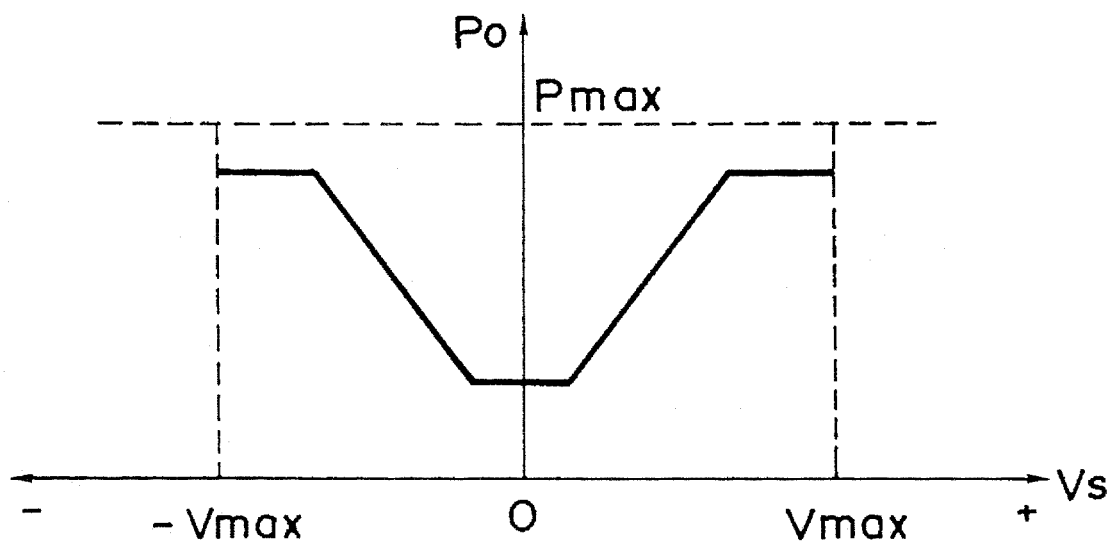
FIG. 8 is a graph showing a value $P_0$ with respect to $V_s$.
Figure 9:
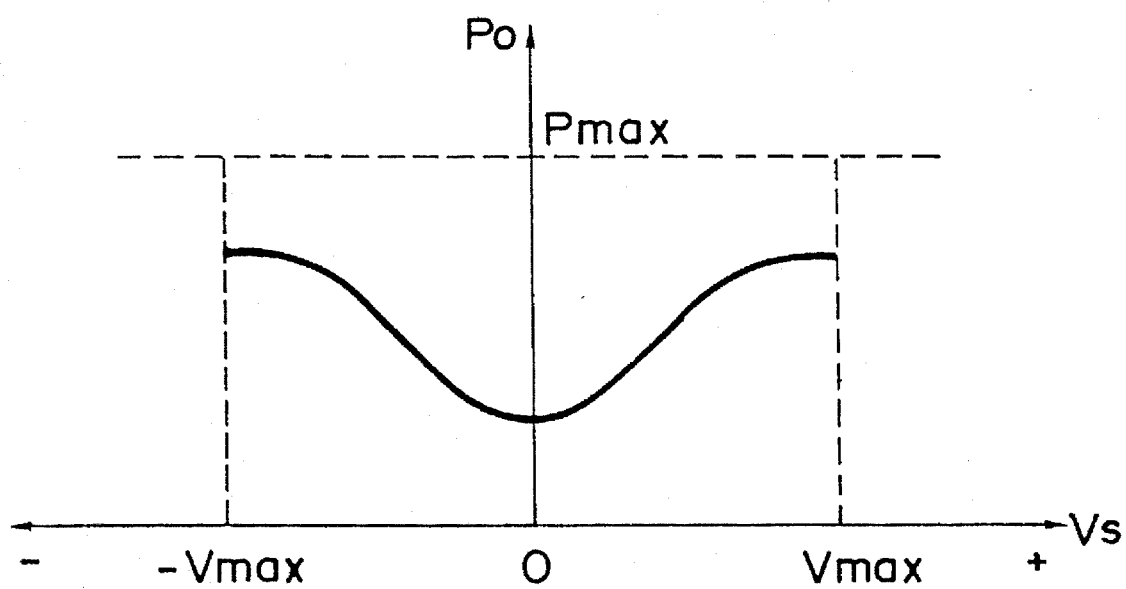
FIG. 9 is a graph showing a value $P_0$ with respect to $V_s$.

The PG 11 outputs pulse signals a, b, c, and d in a predetermined order on the basis of a sync signal CK, and the width of each of the pulse signals a, b, c, and d is changed according to a pulse width command signal PS. The pulse width command signal is expressed by a binary value with a sign for switching a driving direction. FIG. 4 is a waveform chart of the pulse signals a, b, c, and d when, for example, PS=+6. In FIG. 4, since PS=6, each of the pulse signals a, b, c, and d has a pulse width corresponding to six pulses of the signal CK, and since PS has a positive value, the pulse signals are output in the order of a→c→b→d. FIG. 5 is a waveform chart of the pulse signals a, b, c, and d when PS=−4. In this case, since each of the pulse signals a, b, c, and d has a pulse width corresponding to four pulses of the signal CK, and since PS has a negative value, the pulse signals are output in the order of a→d→b→c.

The pulse signals a, b, c, and d from the PG 11 are output to the MOSFETs 5, 6, 7, and 8 to alternately turn on/off these MOSFETs, thereby generating high AC voltages at the secondary sides of the transformers 3 and 4. The generated voltages are applied to the piezoelectric elements 1 and 2 to generate driving forces, thereby moving the movable member (not shown). As the pulse width of each pulse signal from the PG 11 becomes larger, the transformers generate higher voltages, and apply these voltages to the piezoelectric elements 1 and 2.

The frequency of the sync signal CK output from the OSC 12 is controlled by a frequency command signal FS from the CPU 14, thereby controlling the duty of each of the signals a, b, c, and d from the PG 11. A STOP signal from the CPU 14 controls whether or not the pulse signals a, b, c, and d are output from the PG 11.

Figure 3:
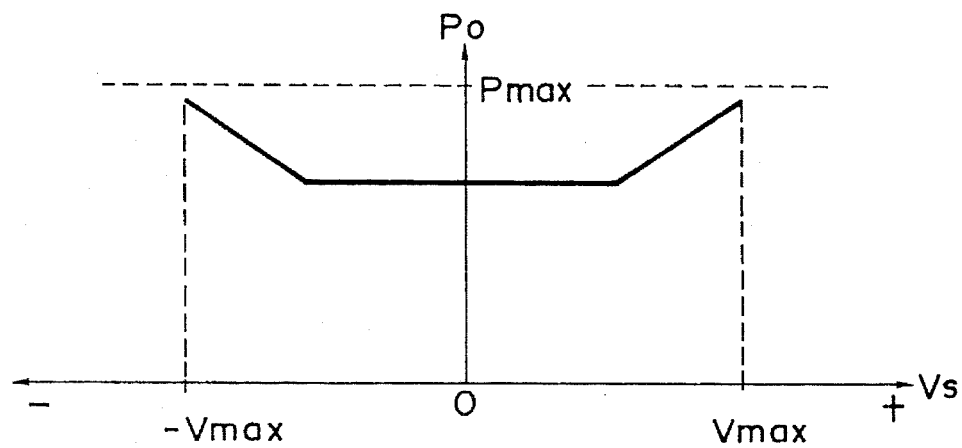
FIG. 3 is a graph showing a value $P_0$ with respect to $V_s$.

The CPU 14 will be described below with reference to FIGS. 2 and 3.

FIG. 2 is a block diagram of a circuit for achieving position control. The circuit shown in FIG. 2 includes coefficient elements 15, 16, 17, and 18 respectively having gains $G_0$, $G_1$, $G_2$, and $G_3$, a differential element 19, integral elements 20 and 21, limit elements 22, 23, and 34, addition elements 25, 26, 27, 28, 29, 30, 31, 32, and 33, an absolute value element 35, and a function element 24 representing a function f(x), which generates an output "1" only when an input =zero.

When a position command TP is input to the addition element 25, the addition element 25 calculates a difference between the command TP and $C_0$ as a count value from the counter 13 for counting pulses which are generated by the position detection encoder (not shown) every time a movable member is moved by a predetermined unit amount. The difference is input to the coefficient element 15 to be multiplied with $G_0$ so as to obtain $G_0(TP-C_0)=V_s$. When $V_s$ is equal to or larger than a predetermined positive or negative maximum speed, the limit element 34 outputs a maximum speed $V_{max}$; otherwise, it outputs a speed command $V_s$. More specifically, the speed command $V_s$ is determined according to the difference between the position command TP representing a target position (target moving amount) and $C_0$ representing the current position (the moving amount so far) of the movable member.

The count value $C_0$ is differentiated by the differential element 19 to calculate an actual speed $V_0$, and the addition element 26 calculates a difference $V_d$ between the actual speed $V_0$ and the speed command $V_s$. Note that the element 19 detects a change in count value $C_0$ per unit time as well as the direction of the change, and calculates a value according to the moving speed and a polarity according to the moving direction. Then, the addition element 28 adds a value obtained by multiplying $V_d$ with the coefficient $G_2$ by the coefficient element 17, and then integrates the product by the integral element 20 to a value obtained by multiplying $V_d$ with the coefficient $G_1$ by the coefficient element 16. The sum is input to the limit element 23 to output a pulse width command PS.

The control operation of the pulse width command PS will be easily described below. The speed command $V_s$ is a speed command proportional to the difference between the position command and the actual position $C_0$ (the current position of the movable member), as described above, and its maximum speed is limited by the limit element 34.

Assume that the speed $V_0$ obtained by detecting a change in actual position per unit time is low with respect to the speed command $V_s$, and the speed command $V_s$ assumes a positive value. Since $V_d$ assumes a positive value, the pulse width command PS is set to define a positive pulse width having a value according to $G_1 \cdot V_d$ via the coefficient element 16. On the other hand, $V_d$ is integrated by the integral element 20 via the coefficient element 17. While $V_s > V_0$ is satisfied, the output from the integral element 20 increases, and the pulse width is determined according to the sum of the output from the element 20 and $G_1 \cdot V_d$. Therefore, while $V_s > V_0$ is satisfied, the pulse width increases, and the speed $V_0$ increases further.

When the actual speed $V_0$ exceeds the speed command $V_s$, $V_d$ assumes a negative value, the output from the integral element 20 decreases, and the output from the coefficient element 16 assumes a negative value. For this reason, the pulse width command PS decreases, and the speed $V_0$ decreases. In this manner, the speed $V_0$ is controlled to coincide with the speed command $V_s$. On the other hand, when the speed command $V_s$ assumes a negative value, if the actual speed $V_0$ is low, $V_d$ assumes a negative value. Thus, the pulse width command PS is set to define a negative pulse width via the coefficient element 16, and the movable member begins to move in a direction opposite to that described above. If the actual speed $V_0$ is still low, the absolute value of the pulse width is increased by the integral element 20, and the speed $V_0$ increases further.

When the actual speed $V_0$ exceeds the speed command $V_s$, $V_d$ assumes a positive value, the output from the integral element 20 changes in the positive direction, and the output from the coefficient element 16 assumes a positive value. For this reason, the absolute value of the pulse width command PS decreases, and the speed $V_0$ decreases. In this manner, an operation in the opposite direction is similarly controlled.

The operations of the limit element 23 and the addition elements 27 and 29 will be briefly described below. The limit element 23 limits the positive or negative maximum value of the pulse width. When a speed input to the limit element 23 exceeds a positive limit, the pulse width command PS is set to define a positive maximum pulse width. The output from the addition element 29 represents a value exceeding the limit since the element 29 calculates a difference between the actual speed and the maximum pulse width. The addition element 27 then subtracts the extra value from the output from the integral element 20, thereby decreasing the output from the integral element 20. More specifically, when a certain input is limited by the limit element 23, since the above-mentioned circuit elements operate to prevent the output from the integral element 20 from being increased, the output from the integral element 20 can be effectively utilized.

A setting algorithm of the frequency command FS in FIG. 2 will be described below.

In a driving operation of the vibration wave actuator, if driving control upon starting of the actuator is made using frequency control, then the frequencies must be adjusted in units of actuators, and when the actuator is driven near a resonance frequency, it is susceptible to a disturbance. Conversely, the frequency control is advantageous in control of, e.g., the driving speed in a steady state. More specifically, the vibration wave actuator has frequency characteristics in which the speed quickly decreases in a region on the low-frequency side of the resonance point, and slowly decreases in a region on the high-frequency side of the resonance point. Therefore, if frequency control is executed using the region on the then high-frequency side, high-precision speed control can be attained.

For this reason, in this embodiment, when the actuator is started, the speed is sequentially increased using voltage control. More specifically, when the actuator is started, the speed is increased by increasing the pulse width command PS.

However, since a driving voltage drift in a steady state is disadvantageous for frequency control, the pulse width is controlled to coincide with a predetermined pulse width ($P_0$) in this embodiment.

The frequency command FS is controlled so that the pulse width command PS coincides with the predetermined pulse width $P_0$. The predetermined pulse width $P_0$ is determined to have a predetermined constant value with respect to the speed command $V_s$, as shown in, e.g., FIGS. 3, 6, 7, 8, and 9.

In these figures, $V_{max}$ represents the limit value of the limit element 34, and $P_{max}$ represents the limit value of the limit element 23. The pulse width command PS is input to the addition element 30 via the absolute value element 35. The element 30 calculates a difference between the pulse width $P_0$ and the absolute value of the pulse width command PS.

When the pulse width command PS is smaller than $P_0$, since $P_d$ assumes a positive value, a value output via the coefficient element 18, the integral element 21, and the limit element 22 increases in the positive direction, and the value of the frequency command FS obtained by adding an initial frequency $F_0$ to the output from the limit element 22 increases, and changes in the high-frequency direction. For this reason, since the speed $V_0$ decreases, the absolute value of the pulse width command PS increases, and the pulse width approaches $P_0$. When the pulse width command PS exceeds the pulse width $P_0$, the frequency command FS changes in the low-frequency direction, and the speed $V_0$ increases. For this reason, the absolute value of the pulse width command PS decreases, and the pulse width approaches $P_0$. In this manner, the frequency command FS is controlled, so that the pulse width command PS coincides with the pulse width $P_0$.

In this manner, the command PS is controlled to coincide with the pulse width $P_0$. For example, when $V_s < V_0$ is satisfied even though the pulse width command PS is small, $V_s = V_0$ can be obtained by changing the frequency in the high-frequency direction without further decreasing PS. Therefore, the actuator can be prevented from becoming inactive due to the small pulse width command PS. When $V_s > V_0$ is satisfied while the pulse width command PS is small, and FS represents a low frequency, FS is controlled to change in the high-frequency direction to increase the pulse width command PS so as to attain $V_s = V_0$. Thus, the frequency can be prevented from being excessively decreased beyond the resonance frequency.

The operations of the limit element 22 and the addition elements 31 and 32 are the same as those of the limit element 23 and the addition elements 27 and 29 described above. The limit element 22 has a lower limit value corresponding to a frequency lower than the resonance frequency of the principal vibration mode (Nth order) of the vibration wave actuator, and an upper limit value corresponding to a frequency higher than the antiresonance frequency of the principal vibration mode (Nth order) lower than the resonance frequency of a mode ([N+1]th order) higher by 1 than the principal vibration mode (Nth order).

The operation of the function element 24 will be described below. When the output $C_0$ from the counter 13 becomes equal to the position command, the output from the addition element 25 becomes zero, and the function f(x) is given by the following formula:

$$f(x) = \begin{cases} 0 & [x \neq 0] \\ 1 & [x = 0] \end{cases}$$

When f(x)=1, a STOP command is enabled, and the actuator is stopped. The STOP command is connected to the reset inputs of the integral elements 20 and 21, and the integral elements 20 and 21 output zero when their reset inputs are "1".

With the above arrangement, a pulse width and frequency suitable for the speed command $V_s$ can be automatically set. The function f(x) can be modified as follows:

$$f(x) = \begin{cases} 0 & [x \neq 0 \text{ and } f(x) = 0, |x| > n \text{ and } f(x) = 1] \\ 1 & [x = 0 \text{ and } f(x) = 0, |x| \leq n \text{ and } f(x) = 1] \end{cases}$$

The initial frequency $F_0$ is a frequency higher than the highest resonance frequency of the principal vibration mode (Nth order), and lower than the lowest resonance frequency of the vibration mode ([N+1]th order) higher by one than the principal vibration mode in consideration of variations among vibration wave actuators upon manufacture.

Second Embodiment

In the first embodiment, the command PS in FIG. 1 is used as the pulse width command. Alternatively, the pulse widths of the signals a, b, c, and d may be fixed, the command PS may be defined as a phase difference command between the signals a and c and between the signals b and d, and the limit value of the limit element 23 may be set to be ±90°. Then, the actuator is stopped when the phase difference is zero, and is driven at the maximum speed when the phase difference is $P_{max}$ (±90°). As in the first embodiment, the actuator is almost stopped when the phase difference is zero, is driven at the maximum speed when the phase difference is 90°, and the driving direction of the actuator can be reversed by the sign of the phase difference. Therefore, the same control as in the first embodiment can be realized.

Third Embodiment

In the first and second embodiments, the command PS in FIG. 1 is used for controlling an instantaneous value. Alternatively, for example, the pulse widths of the signals a, b, c, and d, and the absolute value of a phase difference may be fixed, the sign of the phase difference may be switched a predetermined number of times within a predetermined period of time, and a command for an average value of the positive and negative phase differences within the predetermined period of time may be used as the command PS.

Also, the absolute value of the phase difference of the signals a, b, c, and d may be fixed, a predetermined pulse width and a zero pulse width may be switched a predetermined number of times within a predetermined period of time, and a command for an average value of pulse widths within the predetermined period of time may be used as the command PS.

In each of the above embodiments, the position of a movable member of the vibration actuator is detected, and a setting value is used as the position command. Alternatively, the speed or torque of the movable member may be detected. Furthermore, the driving speed or driving amount of the actuator itself may be detected.

What is claimed is:

1. A vibration type actuator device for obtaining a driving force by applying a driving signal to an electro-mechanical energy converting element section of the device, the device comprising:

(a) detection means for detecting a driving state of an actuator or a member driven by said an actuator;

(b) a first control circuit connected to said detection means, said first control circuit forming a first output signal in accordance with a difference between the detected driving state and a target driving state;

(c) a second control circuit connected to said first control circuit, said second control circuit forming a second output signal having a value corresponding to a difference between the value of the first output signal and a predetermined value, said second control circuit shifting the second output signal value in a first direction when the predetermined value is larger than the first output signal value, and said second control circuit shifting the second output signal value in a direction opposite the first direction when the predetermined value is smaller than the first output signal value; and (d) a driving signal forming circuit for forming the driving signal, said driving signal forming circuit being connected to the first and second control circuits, said driving signal forming circuit shifting a first characteristic value of the driving signal in accordance with the value of the first output signal, and said driving signal forming circuit shifting a second characteristic value of the driving signal in a first direction when the second output signal value shifts in the first direction, and shifting the second characteristic value of the driving signal in a direction opposite the first direction when the second output signal value shifts in the direction opposite the first direction.

2. A device according to claim 1, wherein the second characteristic value is a frequency of the driving signal.

3. A device according to claim 2, wherein the first characteristic value corresponds to a voltage of the driving signal.

4. A device according to claim 2, further comprising a driving circuit for applying driving signals having different phases to said electro-mechanical energy converting element section, and wherein the first characteristic value corresponds to a phase difference between the driving signals.

5. A vibration type actuator device for obtaining a driving force by applying a driving signal to an electro-mechanical energy converting element section, comprising:

(a) detection means for detecting a driving speed of an actuator or a member to be driven by said actuator;

(b) a first control circuit connected to said detection means, said first control circuit forming a first output signal in accordance with a difference between a target speed and the detected speed;

(c) a second control circuit connected to said first control circuit, said second control circuit forming a second output signal in accordance with the first output signal; and (d) a driving signal forming circuit for forming the driving signal, said driving signal forming circuit being connected to the first and second control circuits and determining a first characteristic value of the driving signal in accordance with the first output signal and determining a second characteristic value of the driving signal in accordance with the second output signal, wherein said actuator device generates the driving force according to the first and second characteristic values of the driving signal.

6. A device according to claim 5, wherein said second control circuit forms the second output signal in accordance with a difference between the first output signal controlled by said first control circuit and a predetermined value.

7. A device according to claim 6, wherein the second characteristic value is a frequency of the driving signal.

8. A device according to claim 7, wherein the first characteristic value corresponds to a voltage of the driving signal.

9. A vibration type actuator device for obtaining a driving force by applying a driving signal to an electro-mechanical energy converting element section, comprising:

(a) detection means for detecting a difference between a driving amount or a driving position of an actuator or a member driven by said actuator and target value;

(b) a first control circuit connected to said detection means, said first control circuit forming a first output signal in accordance with the difference detected by said detection means;

(c) a second control circuit connected to said first control circuit, said second control circuit forming a second output signal in accordance with the first output signal; and (d) a driving signal forming circuit for forming the driving signal, said driving signal forming circuit being connected to the first and second control circuits and determining a first characteristic value of the driving signal in accordance with the first output signal and determining a second characteristic value of the driving signal in accordance with the second output signal, wherein said actuator device generates the driving force according to the first and second characteristic values of the driving signal.

10. A device according to claim 9, wherein said second control circuit forms the second output signal in accordance with a difference between the first output signal controlled by said first control circuit and a predetermined value.

11. A device according to claim 10, wherein the second characteristic value is a frequency of the driving signal.

12. A device according to claim 11, wherein the first characteristic value corresponds to a voltage of the driving signal.

13. A vibration type actuator device for obtaining a driving force by applying a driving signal to an electromechanical energy converting element section of the device, the device comprising:

(a) speed detection means for detecting a speed of the actuator or a speed of a member driven by the actuator;

(b) a first control circuit connected to said speed detection means, said first control circuit forming a first output signal having a value corresponding to a difference between the detected speed and a target speed, said first control circuit shifting the first output signal value in a first direction when the target speed is higher than the detected speed, and said first control circuit shifting the first output signal value in a direction opposite the first direction when the target speed is slower than the detected speed;

(c) a second control circuit connected to the first control circuit, said second control circuit forming a second output signal having a value corresponding to a difference between the value of the first output signal and a predetermined value, said second control circuit shifting the second output signal value in a first direction when the predetermined value is larger than the first output signal value, and said second control circuit shifting the second output signal value in a direction opposite to the first direction when the predetermined value is smaller than the first output signal value; and (d) a driving signal forming circuit for forming the driving signal, said driving signal forming circuit being connected to the first and second control circuits, said driving signal forming circuit shifting a first characteristic value of the driving signal in a first direction when the value of the first output signal shifts in the first direction in response to the first output signal value, and said driving signal forming circuit shifting a second characteristic value of the driving signal in a first direction when the second output signal value shifts in the first direction in response to the second output signal value.

* * * * *

UNITED STATES PATENT AND TRADEMARK OFFICE
CERTIFICATE OF CORRECTION

PATENT NO.  : 5,539,268
DATED       : July 23, 1996
INVENTOR(S) : KENICHI KATAOKA It is certified that error appears in the above-indentified patent and that said Letters Patent is hereby corrected as shown below:

At Column [57] Abstract

"wave" should read --wide--.

Column 1

Line 31, "maybe" should read --may be--.
Line 61, "side" should read --side,--.
Line 62, "boundary, therebetween" should read --boundary therebetween,--.

Column 2

Line 9, "the" (second occurrence) should be deleted.
Line 10, "a" should be deleted, and "set" should read --set,--.

UNITED STATES PATENT AND TRADEMARK OFFICE
CERTIFICATE OF CORRECTION

PATENT NO. : 5,539,268

DATED : July 23, 1996

INVENTOR(S) : KENICHI KATAOKA

It is certified that error appears in the above-indentified patent and that said Letters Patent is hereby corrected as shown below:

<u>Column 3</u>

```
Line 20, "shown" should read --shown)--.
Line 21, "actuator)." should read --actuator.--
```

<u>Column 4</u>

```
Line 12, "moved-by" should read --moved by--.
```

Signed and Sealed this

Fifth Day of November, 1996

Attest:

BRUCE LEHMAN

Attesting Officer

Commissioner of Patents and Trademarks